(12) United States Patent
Weydert et al.

(10) Patent No.: US 7,252,728 B2
(45) Date of Patent: Aug. 7, 2007

(54) METHOD FOR FORMING A PNEUMATIC TIRE

(75) Inventors: Marc Weydert, Strassen (LU); Alain Emile Francois Roesgen, Asselborn (LU); Jean-Marie Pilger, Bissen (LU); Denis Dominique Nicolas Lambert, Namur (BE); Uwe Ernst Frank, Marpingen (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 285 days.

(21) Appl. No.: 10/889,494

(22) Filed: Jul. 12, 2004

(65) Prior Publication Data

US 2006/0005912 A1    Jan. 12, 2006

(51) Int. Cl.
  *B29D 30/52*   (2006.01)
  *B29D 30/56*   (2006.01)
  *B29D 30/58*   (2006.01)

(52) U.S. Cl. ............. 156/123; 152/176; 152/188; 152/209.5; 152/209.6; 152/209.17; 156/125; 156/127; 156/129

(58) Field of Classification Search ............ 152/209.5, 152/209.17, 209.18, 175, 176, 179, 187, 152/188, 191, 154.2, 209.6; 156/114, 123, 156/125, 126, 127, 128.6, 129
See application file for complete search history.

(56) References Cited

U.S. PATENT DOCUMENTS

| 1,013,596 | A | * | 1/1912 | Freschl | 152/188 |
| 1,152,470 | A | * | 9/1915 | Adams | 152/188 |
| 1,876,016 | A | * | 9/1932 | Pederson | 152/209.5 |
| 1,897,974 | A | * | 2/1933 | Wolf | 152/188 |
| 2,148,343 | A | * | 2/1939 | Flautt | 152/210 |
| 2,207,098 | A | * | 7/1940 | Maynard | 156/293 |
| 2,272,891 | A | * | 1/1942 | Coben | 152/208 |
| 2,345,518 | A | * | 3/1944 | Wendel | 152/209.17 |

(Continued)

FOREIGN PATENT DOCUMENTS

DE        1 2 73 349 B        7/1968

(Continued)

*Primary Examiner*—Steven D. Maki
(74) *Attorney, Agent, or Firm*—Nancy T. Krawczyk

(57) ABSTRACT

A tire with a changing tread pattern is formed by first forming a tire having a tread, the tread having at least one circumferential or lateral groove. Formed separately is a wearable filler, the wearable filler having a configuration corresponding to at least a portion of the circumferential or lateral groove formed in the tire. After both the tire and the wearable filler have been cured, the wearable filler is located in the radially outer portion of the circumferential or lateral groove or a portion of the circumferential or lateral groove, and secured within the grooves so as to create a groove void radially inward of the wearable filler, the void being exposed upon wear of the tire tread.

14 Claims, 3 Drawing Sheets

U.S. PATENT DOCUMENTS

| | | | |
|---|---|---|---|
| 2,538,491 A | 1/1951 | Winston ................... 152/209 |
| 3,899,013 A * | 8/1975 | Kruse ........................ 152/176 |
| 4,743,468 A | 5/1988 | Jimenez .................... 427/140 |
| 5,316,063 A | 5/1994 | Lagnier ................. 152/209 R |
| 5,503,940 A | 4/1996 | Majumdar et al. .......... 428/492 |
| 5,603,366 A | 2/1997 | Nakayama et al. ..... 152/209 R |
| 6,089,290 A * | 7/2000 | Chlebina et al. ......... 152/209.6 |
| 6,186,202 B1 | 2/2001 | Majumdar et al. ......... 152/209 |
| 6,386,252 B1 * | 5/2002 | O'Brien ..................... 152/208 |
| 6,408,910 B1 | 6/2002 | Lagnier et al. ........ 152/209.17 |
| 6,591,881 B2 | 7/2003 | Artrip ..................... 152/209.5 |
| 6,905,564 B1 * | 6/2005 | O'Brien et al. ............. 156/123 |
| 2004/0016491 A1* | 1/2004 | Martin et al. ............ 152/209.5 |
| 2004/0089384 A1* | 5/2004 | Lopez et al. ............ 152/154.2 |
| 2005/0081972 A1* | 4/2005 | Lopez ................... 152/209.17 |
| 2005/0092411 A1* | 5/2005 | O'Brien ...................... 156/114 |
| 2006/0005905 A1* | 1/2006 | Croissant et al. ........ 152/154.2 |
| 2006/0090829 A1* | 5/2006 | Lopez ................... 152/209.18 |

FOREIGN PATENT DOCUMENTS

| | | | |
|---|---|---|---|
| FR | 1498340 | * | 10/1967 |
| GB | 406896 | * | 3/1934 |
| JP | 02 034406 A | | 2/1990 |
| JP | 2-246809 | * | 10/1990 |
| WO | WO 98/03358 | * | 1/1998 |
| WO | WO 02/090094 | * | 11/2002 |
| WO | WO 03/097384 | * | 11/2003 |

* cited by examiner

METHOD FOR FORMING A PNEUMATIC TIRE

FIELD OF THE INVENTION

The present invention relates to a pneumatic tire, and more particularly to a tread of a pneumatic tire wherein the tread is configured to provide a different tread pattern as the tire is worn. The invention also discloses method for manufacturing such a tire and tire tread.

BACKGROUND OF THE INVENTION

Tire tread patterns are provided with numerous elements such as ribs and blocks, the elements being separated by circumferential and/or transverse grooves. The grooves provide means for water evacuation, aid in noise generation, and form the biting edges of the tread elements.

When a tire is new, the tread has a maximum tread height. This initial height may vary depending upon the intended use of the tire; a winter tire has an increased tread depth in comparison to an all season tire. Regardless of the initial tread depth, when the tire is new, the tread elements have an initial stiffness. The actual stiffness of the tread elements is dictated by the block size, shape, and the presence of any siping. As the tread is worn, the block height decreases while the tread element stiffness increases. As the tread stiffness increases, some desired tire characteristics, such as wet skid and wet handling, decrease. Hydroplaning characteristics also decrease with increased tread wear due to the reduced groove volume.

Methods have been proposed to maintain a relative tread stiffness as the tire wears. One method is to use split siping, wherein the siping is subdivided below the initial tread surface, as shown in U.S. Pat. Nos. 2,538,491 and 5,316,063. As the tread wears, the single sipe becomes multiple sipes. The increased siping reduces the tread element stiffness.

Disclosed in U.S. Pat. No. 6,408,910 is a method to maintain a desired groove volume wherein the tire is manufactured with molds that create submerged grooves that appear when the tread is worn. However, such a tire is difficult to manufacture due to the necessity of removing the molds that create the submerged grooves.

SUMMARY OF THE INVENTION

Disclosed herein is a method of forming a pneumatic tire. The tire is designed to have a variable tread pattern, the tread pattern changing with wear, to achieve similar tread performance for the tire when both new and worn. The changing pattern optimizes the worn tire performance in an attempt to maintain the tire's wet performance characteristics.

Disclosed is a method of forming a pneumatic tire. The tire has a tread having at least one circumferential or lateral groove wherein a wearable filler is located in the radially outer portion of the circumferential or lateral groove or a portion of the circumferential or lateral groove. A groove void is created radially inward of the wearable filler, the void being exposed upon wear of the tire tread. The disclosed method has the following steps: a) forming a green tire; the green tire having a tread comprising a circumferential or lateral groove; b) curing the tire; c) forming a wearable filler; the filler having a configuration corresponding to at least a portion of the circumferential or lateral groove formed in the tire; d) curing the wearable filler; and e) securing the wearable filler in the tire tread in the radially outer portion of at least a portion of the circumferential or lateral groove of the tire.

In one disclosed aspect of the method of forming a tire, a plurality of wearable fillers are secured in the tire tread.

In another disclosed aspect of the method of forming a tire, the wearable filler is formed by extrusion, molding, or stamping. The wearable filler may be formed as a long strip or has an individual element. The wearable filler is formed to correspond to the shape of the grooves or groove portions into which the filler is secured. Additionally, the wearable filler may be formed with different thickness portions.

In another disclosed aspect of the method of forming a tire, the wearable filler is mechanically secured in the tire tread, chemically secured in the tire tread, or secured by a combination of mechanical and chemical securing means. When chemically securing the wearable filler, the chemical means includes an adhesive selected from the group consisting of cyanoacrylates, isocyanates, cholorprenes, polyurethane resins, and thin layers of uncured elastomer. Alternatively, the wearable filler is secured to the tire tread by means of a retread adhesive.

Also disclosed is a method of securing a wearable filler to a tire tread employing the following steps a) applying a green curable compound to either the wearable filler or to the portion of the circumferential or lateral groove into which the wearable filler is to be secured; and b) hot vulcanizing the tire to cure the green curable compound.

BRIEF DESCRIPTION OF THE DRAWINGS

The invention will be described by way of example and with reference to the accompanying drawings in which.

DETAILED DESCRIPTION OF THE INVENTION

Figure 1:
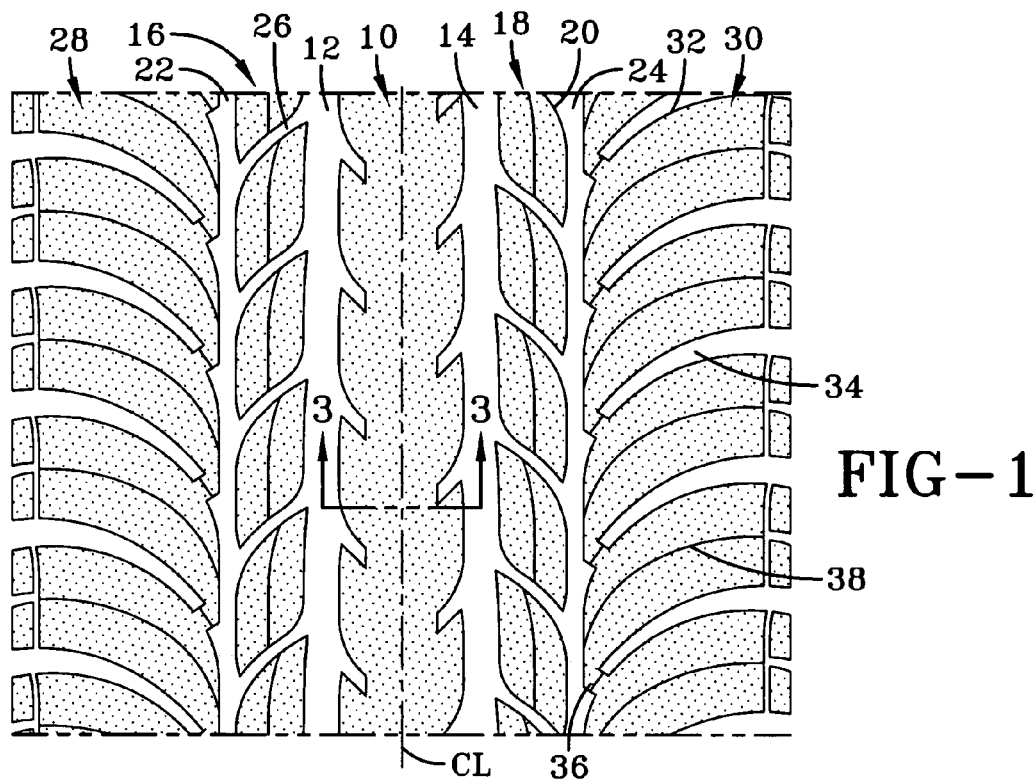
FIG. 1 is a is a tread in accordance with the invention.

The following language is of the best presently contemplated mode or modes of carrying out the invention. This description is made for the purpose of illustrating the general principles of the invention and should not be taken in a limiting sense. The scope of the invention is best determined by reference to the appended claims.

A tire tread, located on the radially outer surface of a tire, is characteristically defined by a plurality of extending tread elements in the form of blocks and/or ribs. Such tread elements are formed by circumferentially extending and/or laterally extending grooves. In the exemplary tread of FIG. 1, at the unworn stage, the tread is defined by four circumferentially extending grooves, dividing the tread into five rows of tread elements. The tread element row 10 located on the tread centerline CL is a rib defined by circumferential grooves 12, 14. The tread element rows 16, 18 bordering the center tread element row 10 are a plurality of blocks 20 formed by the circumferential rows 12, 14, 22, 24 and lateral grooves 26.

Axially outward of the outer circumferential rows 22, 24 are the axially outermost tread element rows 28, 30. These rows 28, 30 have a plurality of quasi blocks 32. The blocks 32 are formed by the circumferential grooves 22, 24 and inclined lateral grooves 34; however, the blocks 32 are connected at the axially inner edges by a connecting element 36. The blocks 20, 32 and the connecting element 36 are also provided with sipes 38 to increase the number of biting edges in the tread.

The tread of FIG. 1 is the tread at the unworn stage, but it is not the tire tread formed during molding of the tire employing the tread, nor is it the same tread pattern that occurs after wear of the tire.

Figure 2:
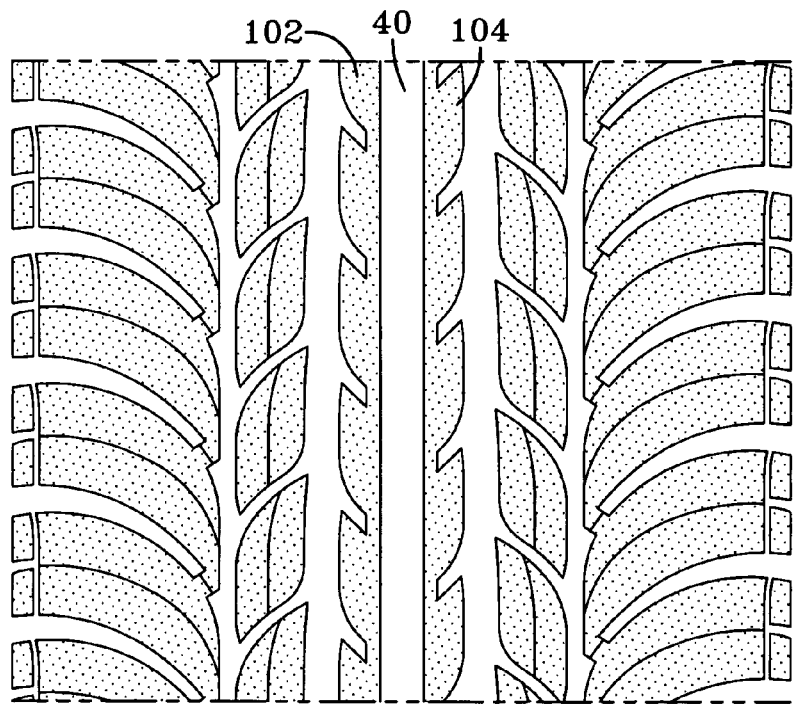
FIG. 2 is the tread of FIG. 1, following a defined amount of wear.

The tread of FIG. 2 is the tread of FIG. 1 after approximately 30% wear and is similar to the tread configuration of the tread of FIG. 1 after molding of the tire. The worn/molded tread has an additional circumferential groove 40 that now divides the center tread element row 10 into two smaller width rows 102, 104. The presence of the exposed groove 40 after a period of wear increases the wet performance characteristics of the tire.

Figure 3:
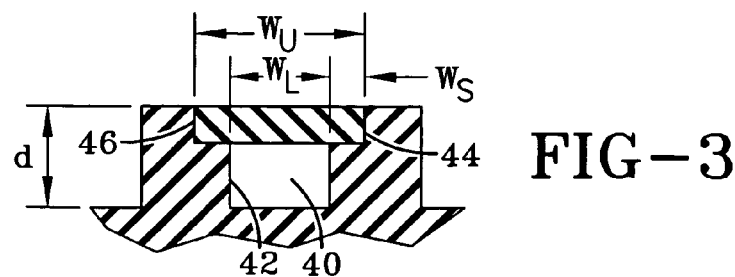
FIG. 3 is a cross-sectional view along lines 3-3 in FIG. 1.

The groove 40 is present in the tread when the tire is cured. FIG. 3 is a cross-sectional view of the center tread element row 10 of the unworn tire tread, along line 3-3 in FIG. 1. The tread has a tread depth d measured from the non-skid depth to the tread surface. The groove 40, when initially formed has groove walls 42 of a dual width configuration. The width $W_U$ between the groove walls 42 in the radially outer portion of the groove 40 is greater than width $W_L$ between the groove walls 42 in the radially inner portion of the groove 40. Due to the differing widths $W_U$, $W_L$ of the groove 40, the groove walls 42 have stepped portions 44. Each step portion 44 has a width $W_S$ of 5 to 80% of the lower groove width $W_L$. The step portions 44 provide a surface upon which a post-assembled tread element 46 (hereinafter referred to as a PATE) is applied.

The PATE 46 is a separately shaped rubber element designed to be worn away during normal tire wear, i.e. a PATE is wearable filler inserted in a groove or a portion of a groove. The PATE 46 applied to the tread of FIG. 2 is formed as a long strip of rubber or a ring shaped rubber element. The presence of the PATE 46 results in a hidden groove 40 that is revealed upon a predetermined amount of tread wear.

Figure 4A:
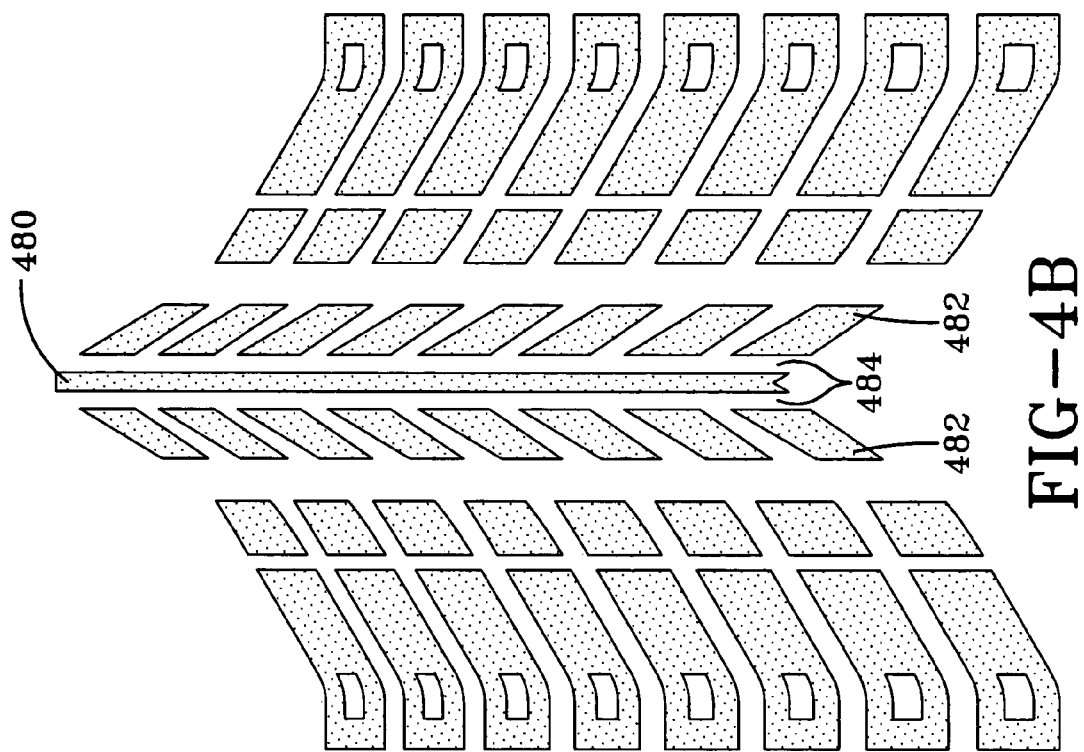
FIG. 4A is another tread embodiment in accordance with the invention.

FIG. 4A illustrates another tire tread configuration for an unworn tread. The center tread element row 10 is a continuous rib 48, functioning more as individual blocks due to the inclined lateral grooves 50. Axially outward of the center tread element row 10, the intermediate tread element rows 16, 18, have a plurality of individual blocks 52, 54. The outermost tread element rows 28, 30 are formed from a plurality of blocks 58, 60.

Figure 4B:
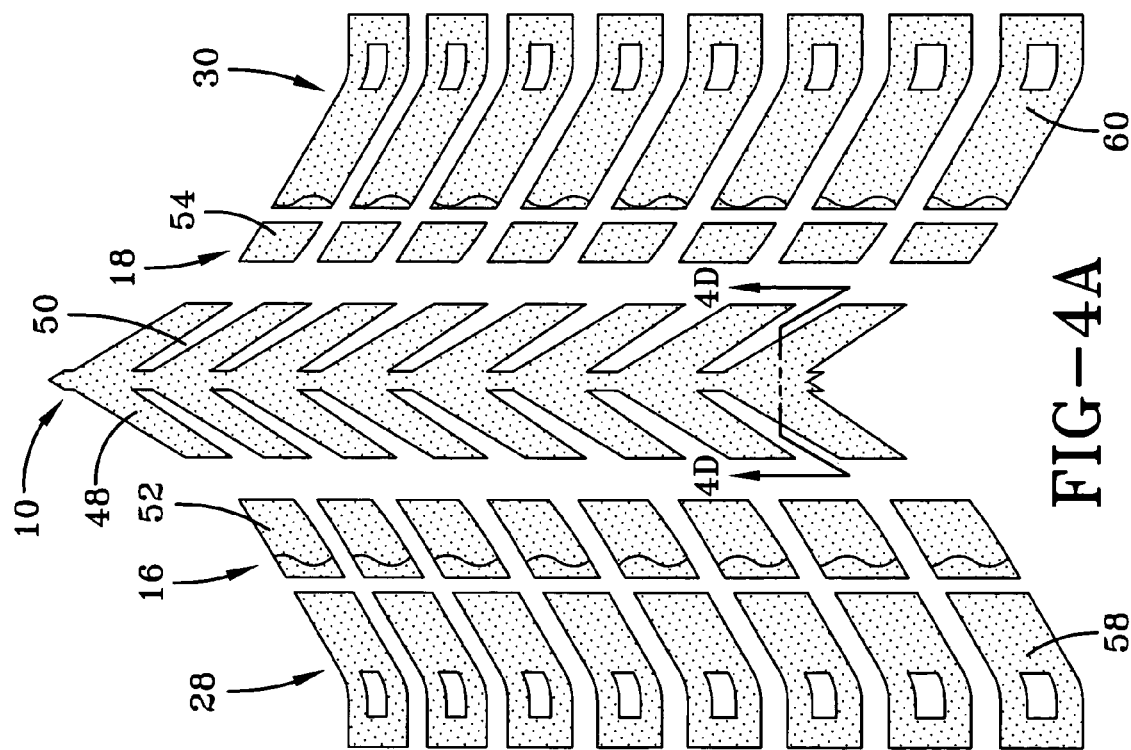
FIG. 4B is the tread of FIG. 4A, following a defined amount of wear.

Upon wear of the tread of FIG. 4A, the tread pattern of FIG. 4B is exposed. The center tread row element 10 is transformed into a narrow width rib 480 located on the tread centerline and axially adjacent rows of blocks 482 separated by new circumferential grooves 484. Instead of using multiple long strips of rubber or multiple rubber rings, multiple similar shaped PATEs 62 are used, with one PATE 62 for each set of axially adjacent blocks 482.

Figure 4C:
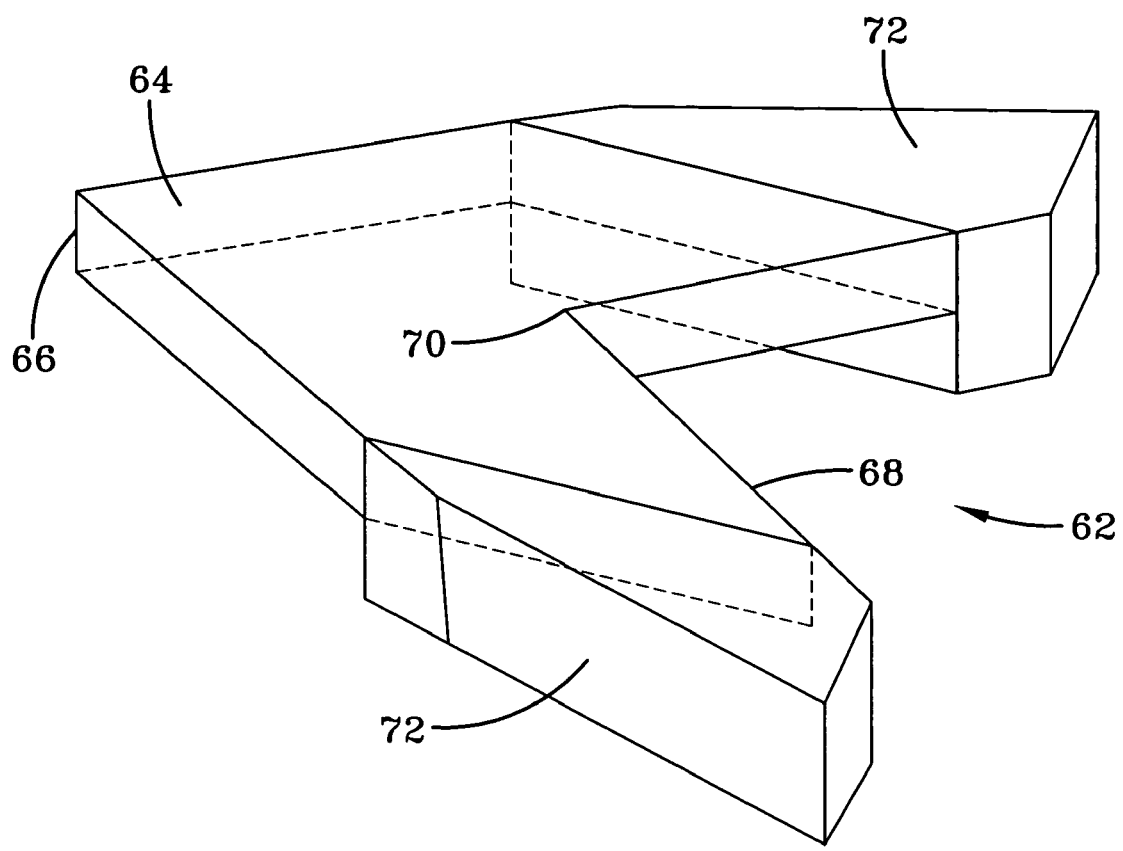
FIG. 4C is one embodiment of a post assembled tread element.

The individual PATEs 62 also have several features that enable the PATEs 62 to lock into one another and be secured onto the tread. The PATEs 62 have an arrowhead type configuration, see FIG. 4C, with a leading edge 64 defined by a forward point 66. The trailing edge 68 has an identical configuration, forming a concave point 70. The identical leading and trailing edges 64, 68 allow multiple PATEs 62 to be aligned and fitted together in a puzzle-piece like manner.

The ends of the lateral edges 72 have a greater thickness than the central portion of the PATE 62. The greater thickness portions have a configuration corresponding to portions of the circumferential grooves 484 between the center rib 480 and adjacent blocks 482. The center rib 480 is formed with a radial height less than the adjacent blocks 482, see FIG. 4D. When the PATE 62 is fitted onto the tread, the lateral edges 72 embrace the center rib 480, assisting in securing the PATE 58 onto the tread. For such a PATE configuration, which interlocks onto a pre-existing tread element, the groove to be covered by the PATE need not be formed with a stepped width configuration as the groove 40 shown in FIG. 3.

While two specific tread and PATE configurations have been illustrated, the concept of using post-assembled tread elements may be applied to almost any conceived tread pattern in order to create a tread configuration that changes significantly upon wear; the change enabling the tread to maintain desired tire characteristics. Alternative constructions for the PATE are disclosed in Assignee's co-pending patent application, U.S. Patent Application Publication No. 2006/0005905 A1, which is fully incorporated by reference herein.

The application of the PATE to the tread is a critical feature, as the PATE must remain secured to the tread for a predetermined amount of tread wear or the life of the PATE. To secure the PATEs onto the tread, the PATEs may be glued or cold-vulcanized to the original, or just molded, tire tread elements. This guarantees the PATEs will stick to the tire, even in heavy handling conditions, and during advance wear of the PATEs. Another alternative is to use a green compound interface between the PATEs and the original tread elements. After applying the green compound interface to either the PATE or the tread element, the tire is hot vulcanized to cure the interface compound.

The preferred method of securing the PATE to the tread is through the use of a cured to cured adhesive. The tread, formed with the voids, is cured completely during conventional tire curing. The PATE(s) to be applied to the tread are separately cured separately. The PATEs may be formed by extrusion, molding, or stamping. The method of formation of the PATE is best dictated by the configuration of the PATE and the elastomeric material selected for the PATE.

After curing of both the tread and the PATE, the PATE is glued to the tire by means of a suitable adhesive. Suitable classes of adhesives include cyanoacrylates, isocyanates, chloroprenes, polyurethane resins, conventional rubber applicable curing adhesives such as adhesive means used in tire retreading, or thin layers of uncured elastomer. Suitable adhesives are preferably are fast setting adhesives having an operating temperature in the range of at least −20° C. to at least +120° C. Additionally, the adhesive should be water resistant. The adhesives may be solvent based or water based.

Cyanoacrylates useful in the practice of this invention are preferably liquid monomers having the formula $H_2C=C(CN)-COOR$ wherein R is an aliphatic, aromatic or cycloalphatic hydrocarbon, having from 1 to 10 carbon atoms, preferably alkyl, for example, methyl, ethyl, propyl, isopropyl, butyl, isobutyl, amyl, pentyl, hexyl, heptyl, ethylhexyl, octyl, nonyl and decyl. One preferred feature of R is that the monomer be liquid at room temperature (20° C.)

and atmospheric pressure and a carbon atom of R must be directly bound to the $H_2C=C(CN)—COO—$ group. The cyanoacrylate monomers can contain any other compounding ingredients which are normally employed such as viscosity modifiers, coloring agents, fillers, pigments and the like. One commercial example of a suitable cyanoacrylate is Loctite 407, manufactured by Loctite Corporation.

Chloroprenes are also suitable adhesives. One commercial example of a suitable chloroprene adhesive is Scotch—Grip 1300L, manufactured by 3M.

The cyanoacrylate, isocyanate, and chloroprene adhesives may be solvent based. Known solvents include ketones, preferably liquid organic compounds in which the carbonyl group, $C=O$, is attached to two alkyl groups. Suitable alkyl groups include any hydrocarbons having from 1 to 6 carbon atoms, for example: methyl, ethyl, propyl, isopropyl, butyl, isobutyl, amyl, pentyl, and hexyl. The two alkyl groups attached to the carbonyl group may be the same, such as dimethyl ketone or diisobutyl ketone, or may differ, such as methyl ethyl ketone, methyl-n-propyl ketone, methyl-n-butyl ketone, and methyl isobutyl ketone. The ketone may be compounded with other ingredients such as viscosity modifiers, coloring agents, fillers, pigments and the like. Alternatively, the adhesives may be present in water-based emulsions.

Polyurethane resins suitable for use in securing PATEs to a tire tread. The polyurethane resin may be provided as a waxy solid, suitable for application to the PATE and the tread. One commercial example of a suitable polyurethane resin is Jet Weld TS-230, manufactured by 3M.

Retread adhesives useful in the practice of this invention include those used to form a laminate of a buffed cured tire carcass and a cured tire tread. Examples include, but are not limited to, the solventless adhesives disclosed in U.S. Pat. Nos. 5,503,940 and 6,186,202. One suitable retread adhesive system is a system composed of two solutions mixed together prior to application. The first solution contains dithiocarbamates of ammonium, sodium, or zinc, such as N-penta-methylen-ammonium-N'-penta-methylen-dithicarbamate. The second solution contains sulfur. Both solutions may contain additionally unsaturated diene polymers and are either water based or organic solvent preparations. The adhesive system vulcanizes at room temperature, or higher, such as 60° C. or greater. Examples of retread adhesives systems are also disclosed in U.S. Pat. Nos. 6,303,683, 6,030,676, and 3,951,720.

Other means applicable herein include a thin layer of vulcanizable rubber material or cushion gum. Such a vulcanizable rubber material preferably has the same base composition as either the tread or the PATE, may be however any rubber composition that will achieve the desired cure and adhesive properties desired for securing the PATEs to the tire tread for the life of the PATE.

Figure 4D:
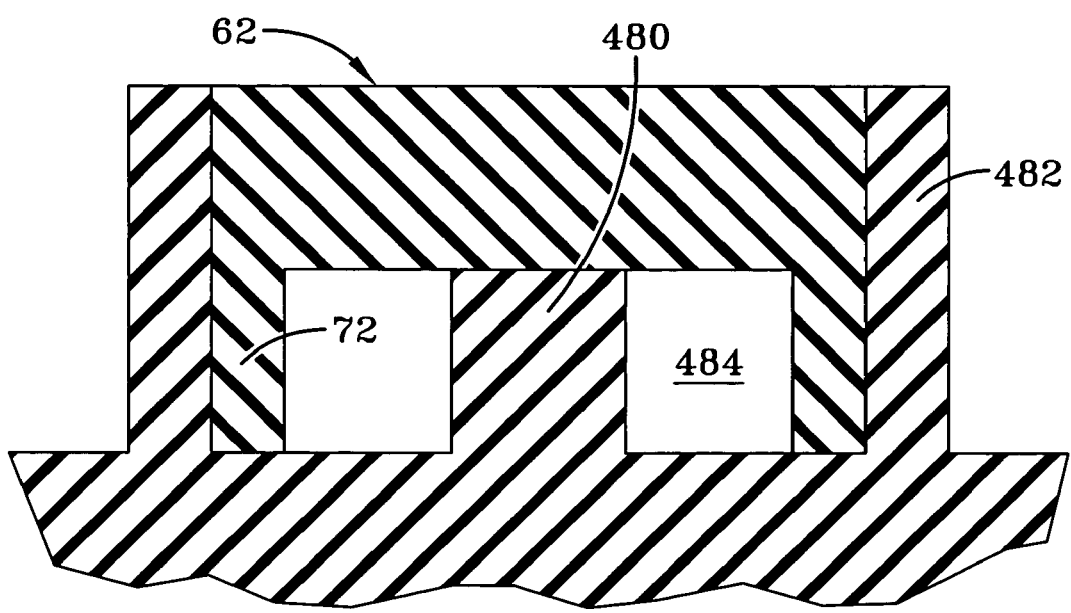
FIG. 4D is a cross-section view along lines 4D-4D in FIG. 4A.

Another method of securing the PATE is to use a mechanical action, such as that illustrated in FIG. 4D. A clamping rib may be formed at the base of the PATE. Alternatively, the sides of the PATE may be formed with a 3-dimensional surface to correspond to matching 3-dimensional groove sidewalls to allow for interlocking between the groove and the PATE.

Any combination of any of the disclosed mechanical and chemical securing means may also be used.

The PATE may be formed from the same elastomeric compound used to form the tire tread. Alternatively, the PATE may be formed from an elastomeric compound different from the tire tread. For example, for the tread of FIGS. 1-3, the PATE is located on the tread centerline CL, creating constant contact with the ground during tire operation. It may be desired to provide the center of the tire with a tread compound formulated for greater wear resistance; thus such a PATE compound may be formulated with a greater wear resistance. Alternatively, to expose the hidden voids at a faster rate, the PATEs may be formed of a softer compound that wears faster than the main tread compound.

What is claimed is:

1. A method for forming a tire, the tire comprising a tread having a non-skid depth d, the tread comprising tread elements separated by a tread groove and a circumferential or lateral groove in a least one of the tread elements, wherein a wearable filler is located in the radially outer portion of the circumferential or lateral groove or a portion of the circumferential or lateral groove, a groove void being created radially inward of the wearable filler, the void being exposed upon wear of the tread, the method comprising the following steps:
   a) forming a green tire; the green tire having; a tread
   b) curing the tire, the cured tire tread comprising tread elements separated by a tread groove and a circumferential or lateral groove in at least one of the tread elements; each of the tread groove and the circumferential or lateral groove having the non-skid depth d
   c) forming a wearable filler; the filler having a configuration corresponding to at least a portion of the circumferential or lateral groove formed in the tire;
   d) curing the wearable filler;
   e) securing the wearable filler in the cured tire tread in the radially outer portion of at least a portion of the circumferential or lateral groove of the tire such that the radially outer surface of the wearable filler is substantially flush with the ground contacting surface of the at least one tread element, thereby creating a groove void exposable upon wear of the tread.

2. The method of claim 1 wherein a plurality of wearable fillers are secured in the tire tread.

3. The method of claim 1 wherein the wearable filler is formed by extrusion, molding, or stamping.

4. The method of claim 1 wherein the wearable filler is formed as a long strip.

5. The method of claim 1 wherein the wearable filler is formed with different thickness portions.

6. The method of claim 1 wherein the wearable filler is mechanically secured in the tire tread.

7. The method of claim 1 wherein the wearable filler is chemically secured in the tire tread.

8. The method of claim 1 wherein the wearable filler is secured to the tread by both mechanical and chemical securing means.

9. The method of claim 1 wherein the wearable filler is cold vulcanized to the tire tread.

10. The method of claim 1 wherein the method of securing the wearable filler to the tire tread involves the steps of
   a) applying a green curable compound to either the wearable filler or to the portion of the circumferential or lateral groove into which the wearable filler is to be secured;
   b) hot vulcanizing the tire to cure the green curable compound.

11. The method of claim 1 wherein the wearable filler is secured to the tire tread by means of an adhesive selected from the group consisting of cyanoacrylates, isocyanates, cholorprenes, polyurethane resins, and thin layers of uncured elastomer.

12. The method of claim 1 wherein the wearable filler is secured to the tire tread by means of an adhesive selected from the group consisting of a solvent based adhesive, a water-based emulsion adhesive, or a solvent-less based adhesive.

13. The method of claim 1 wherein the wearable filler is secured to the tire tread by means of a retread adhesive.

14. The method of claim 1 wherein the circumferential or lateral groove formed in the tire has a radially outer portion width WU greater than a radially inner portion width WL, forming a step portion in the groove.

* * * * *